(12) United States Patent
Heijmink

(10) Patent No.: US 9,290,322 B2
(45) Date of Patent: Mar. 22, 2016

(54) ARTICLE STORE

(71) Applicant: NEDCON Magazijninrichting B.V., Doetinchem (NL)

(72) Inventor: Mark B. J. Heijmink, Millingen a. d. Rijn (NL)

(73) Assignee: NEDCON Magazijninrichting B.V., Doetinchem (NL)

( * ) Notice: Subject to any disclaimer, the term of this patent is extended or adjusted under 35 U.S.C. 154(b) by 0 days.

(21) Appl. No.: 14/490,760

(22) Filed: Sep. 19, 2014

(65) Prior Publication Data
US 2015/0076090 A1    Mar. 19, 2015

(30) Foreign Application Priority Data

Sep. 19, 2013   (DE) .......................... 10 2013 110 361

(51) Int. Cl.
| | |
|---|---|
| A47F 7/00 | (2006.01) |
| B65G 1/04 | (2006.01) |
| A47B 47/00 | (2006.01) |
| A47B 55/00 | (2006.01) |
| B65G 1/02 | (2006.01) |
| A47B 57/40 | (2006.01) |

(52) U.S. Cl.
CPC .............. *B65G 1/04* (2013.01); *A47B 47/0058* (2013.01); *A47B 47/0083* (2013.01); *A47B 55/00* (2013.01); *A47B 57/402* (2013.01); *B65G 1/02* (2013.01)

(58) Field of Classification Search
CPC .... A47B 47/021; A47B 47/03; A47B 47/027; A47B 47/028; A47B 47/0058; A47B 47/0083; A47B 55/00; A47B 57/402; B65G 1/04; B65G 1/02

USPC .............. 211/49.1, 59.2, 59.4, 189–191, 184
See application file for complete search history.

(56) References Cited

U.S. PATENT DOCUMENTS

| | | | | |
|---|---|---|---|---|
| 4,078,664 | A | * | 3/1978 | McConnell .................... 211/189 |
| 4,801,026 | A | * | 1/1989 | Andersson .................... 211/183 |
| 5,279,431 | A | * | 1/1994 | Highsmith et al. ........... 211/189 |
| 5,415,297 | A | * | 5/1995 | Klein et al. ..................... 211/40 |
| 5,628,415 | A | * | 5/1997 | Mulholland .................. 211/189 |
| 5,848,709 | A | * | 12/1998 | Gelphman et al. .............. 211/40 |
| 6,039,192 | A | | 3/2000 | Hollander |

(Continued)

FOREIGN PATENT DOCUMENTS

| | | |
|---|---|---|
| DE | 10 2008 001 972 A1 | 12/2009 |
| EP | 0 935 932 A1 | 8/1999 |

(Continued)

*Primary Examiner* — Korie H Chan
(74) *Attorney, Agent, or Firm* — Gudrun E. Huckett

(57) ABSTRACT

An article store is provided with vertical main supports, front and rear crossmembers arranged transversally to the storage and retrieval directions and fastened on the main supports, and at least one bearing profile extending in the storage and retrieval directions and supported vertically relative to the front crossmember. The upper side of the bearing profile is located in a plane higher than the upper edge of the front crossmember and forms a bearing device for the articles. The bearing profile is supported vertically on the front crossmember by a support whose upper end is connected to the bearing profile. The front crossmember is provided with form-fit structures in order to fix the vertical support of the bearing profile at least in the longitudinal crossmember direction. The lower end of the support engages form-fit structures of the front crossmember.

10 Claims, 2 Drawing Sheets

(56) References Cited

U.S. PATENT DOCUMENTS

| | | | |
|---|---|---|---|
| 6,389,991 B1* | 5/2002 | Morrisson | 108/61 |
| 6,431,375 B2* | 8/2002 | Spencer | 211/106 |
| 7,896,171 B2* | 3/2011 | Battaglia | 211/59.2 |
| 8,439,207 B2* | 5/2013 | Currin | 211/45 |
| 2004/0124161 A1* | 7/2004 | Lau | 211/40 |
| 2008/0145197 A1* | 6/2008 | Taylor et al. | 414/276 |
| 2011/0309044 A1* | 12/2011 | Morrow | 211/59.2 |

FOREIGN PATENT DOCUMENTS

| | | |
|---|---|---|
| EP | 2 468 138 B1 | 6/2012 |
| GB | 2 174 783 A | 11/1986 |

\* cited by examiner

ARTICLE STORE

BACKGROUND OF THE INVENTION

The invention relates to an article store for, for example, carton multipacks or palletized stacks of goods, comprising vertical main supports, front and rear crossmembers, which are arranged transversally to the storage and retrieval directions, and are fastened on the main supports, and at least one bearing profile, which extends in the storage and retrieval directions, which is supported vertically in relation to the front crossmember, of which the upper side is located in a plane higher than the upper edge of the front crossmember and which forms a bearing means for the respective article, wherein the bearing profile is supported vertically on the crossmember by a support, of which the upper end is connected to the bearing profile.

Such an article may be the smallest unit in often extensive rack stores and, in particular, in high-bay stores. The operations of storing and retrieving the individual articles take place from a transverse aisle, by means of fork-lift trucks or by storage-and-retrieval units. From the transverse aisle, article stores arranged on either side can be charged with goods and/or goods can be retrieved therefrom. The article store comprises vertical supports, which are connected to one another by transversally arranged crossmembers. Extending in the storage and retrieval directions between in each case a front and a rear crossmember are bearing profiles, of which the upper side forms the actual bearing means for the articles. The bearing means are open in a forward direction, i.e. in the direction of the transverse aisle, and therefore the article can be retrieved by straightforward pulling action and therefore by a purely horizontal movement. At the other end, that is to say the rear end, the bearing means is delimited by a stop, which thus delimits the depth of the store in the rearward direction and prevents the article from being accidentally stored too far in.

The operation of storing articles takes place by means of a transporting fork which, for the purpose of transporting the article, is raised from beneath against the underside of the article. In order to move the article into a compartment, it is also necessary to have enough space present for the transporting fork to move in. In order to achieve this, the bearing means of the bearing profiles, rather than being located in a plane of the transversely running crossmembers, are located in a higher-level plane, this difference in height being at least equal to the overall height of the transporting fork.

One possible way of arranging the actual bearing means for the article at a higher level than the upper edge of the crossmember consists in using bearing profiles in the cross-sectional configuration of a downwardly open U or of a top-hat profile. It is often the case, however, that the vertical space achieved as a result is insufficient for the task of moving a transporting fork in, stringent requirements having to be met at least by the preciseness of the height positioning of the storage-and-retrieval unit or the fork-lift truck used for storage and retrieval purposes. If, on the other hand, such a bearing profile has a considerably greater profile height, it is also the case that the use of material is correspondingly greater. In addition, a bearing profile with a large profile height, in comparison with the profile width, may be laterally unstable.

Another possible way of arranging the actual bearing means for the article at a higher level than the upper edge of the crossmember is described in EP 0 935 932 A1. The bearing profile is supported at the front here not directly on the crossmember, but indirectly via a vertical support. The latter is connected to the bearing profile by a form fit and, at the other end, is welded to the crossmember. This fastening on the crossmember takes place in a separate production process, prior to the actual assembly of the article store.

It is an object of the invention to create an article store which does not have to meet stringent requirements relating to the preciseness of the height positioning of a storage-and-retrieval unit or of the fork-lift truck used for storage and retrieval purposes and does not require significant production and assembly outlay.

SUMMARY OF THE INVENTION

This object is achieved for an article store having the features indicated in the introduction, wherein the front crossmember is provided with form-fit structures, in order to fix the vertical support of the bearing profile at least in the longitudinal crossmember direction, and wherein the lower end of the support is designed for engagement in the form-fit structures of the front crossmember.

The form-fit structures of the front crossmember are preferably slots, in which the lugs formed on the vertical support engage.

In order that the vertical support is locked on the crossmember at the same time as it is installed, the lugs and slots are shaped and arranged such that the lugs can be introduced all the way into the slots only by virtue of the support being pivoted about a horizontal pivot axis.

In addition, the lugs may have an angled portion, as a result of which the supports are locked in the vertical direction.

By way of a further configuration, it is proposed that the support and the bearing profile supported thereon, in their connecting region, be provided with latching elements which lock in relation to one another.

By way of a further configuration, it is proposed that the rear crossmember be arranged at a higher level than the associated front crossmember, and that the bearing profile has its rear end supported directly on the rear crossmember. This allows a simplified construction with relatively low assembly outlay, since the additional vertical support is required only in the region of the front crossmember, but not in the region of the rear crossmember, which is therefore arranged at a higher level than the associated front crossmember.

Finally, it is proposed that the cross section of the rear crossmember be made up of a horizontal limb, on which the bearing profile is supported, and a vertical limb, which extends vertically beyond the upper side of the bearing profile in order to form a stop. This stop delimits the maximum depth to which the article can be stored and allows optimal utilization of the storage depth in that an article which is to be newly stored in the first instance is set down on the bearing profile in a more or less rough depth position and then is displaced in the direction of the rear crossmember until the article strikes against the stop.

BRIEF DESCRIPTION OF THE DRAWINGS

Further advantages and details can be gathered from the following description of two exemplary embodiments, with reference being made to the drawings.

DESCRIPTION OF PREFERRED EMBODIMENTS

The basic static construction of the usually multi-story article rack is formed by essentially vertical main supports 1 and horizontally arranged crossmembers 2, 3, each connecting two main supports 1 to one another. In each case two main supports 1 are connected by a front crossmember 2 on the front side of the article rack, on which usually a transverse aisle for a storage-and-retrieval unit or for a fork-lift truck, which can be displaced into a position in front of each individual storage location L, is located in order for the goods or articles to be stored and retrieved. It is likewise the case that in each case two main supports 1 are connected to one another by a rear crossmember 3 on the rear side of the article store. In order to connect the crossmembers 2, 3 to the main supports 1, the main supports 1 may be configured in the form of perforated profiles. This allows the crossmembers 2, 3 to be fastened at different heights, depending on the distance between perforations on the perforated profiles.

Figure 1:
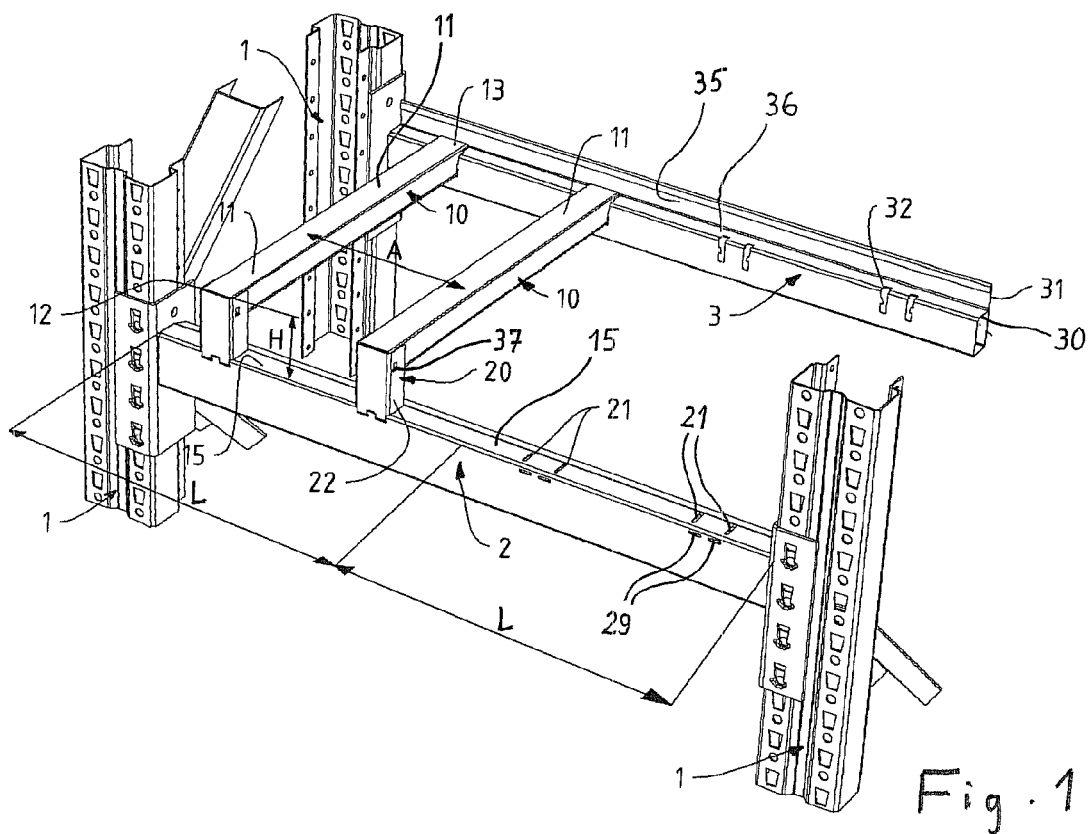
FIG. 1 shows a perspective illustration of a first embodiment of an article store having two storage locations, each for one article, arranged one beside the other.

In the case of the exemplary embodiment according to FIG. 1, the rear crossmember 3 is not located at the same height as the associated front crossmember 2. Instead, the rear crossmember is fastened on the main supports 1 at a higher level, equivalent to the difference in height H, than the associated front crossmember 2.

Figure 2:
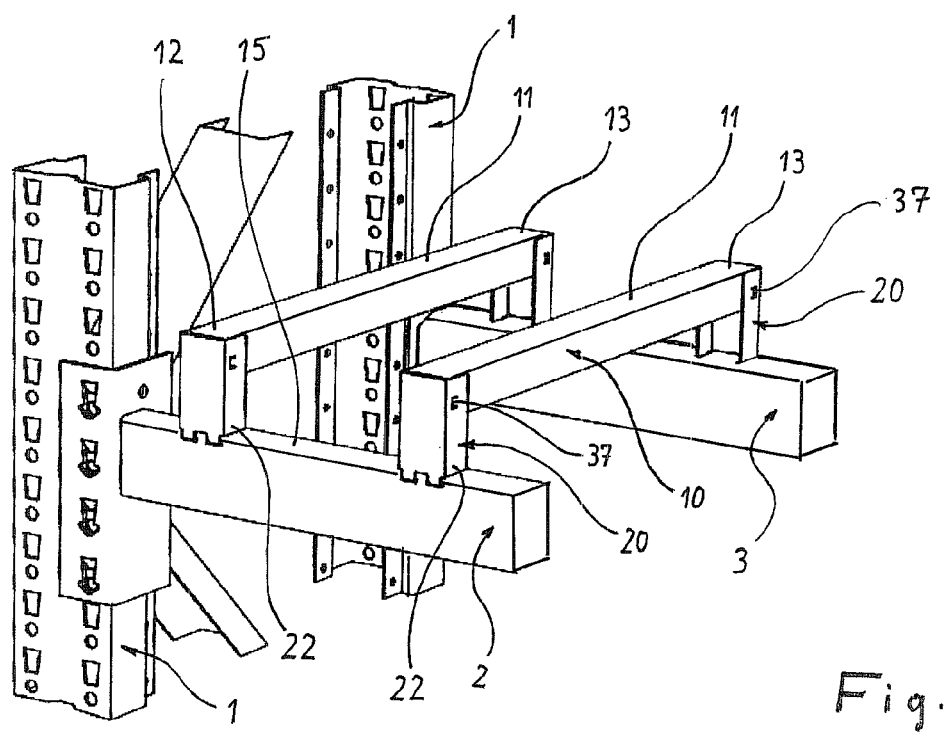
FIG. 2 shows a perspective illustration of a second embodiment of an article store having a storage location.

In contrast, in the case of the exemplary embodiment according to FIG. 2, the rear crossmember 3 is located at the same height as the associated front crossmember 2.

In the case of both exemplary embodiments, the bearing profiles 10 extend from the front crossmember 2 to the rear crossmember 3. Each storage location L, which is intended for the storage of an article, has at least two bearing profiles 10, which extend parallel to, and at a distance A apart from, one another. The flat upper side 11 of each bearing profile 10 forms the actual bearing means for the article and extends horizontally from front to rear. Since at least two bearing profiles 10 with, correspondingly, two bearing means 11 are present for each storage location L, stable support is provided for the respective article, and there is no risk of the article tilting laterally. It should preferably be the case here that the distance A between the two bearing profiles 10, which form a storage location L, is between 60% and 100% of the width of the article which is to be stored there.

For the purpose of storing an article in the rack, the fork-lift truck or the storage-and-retrieval unit engages beneath the article. This is done using transporting forks, which can be moved into the article store and on which the underside of the article is supported. In order for the transporting fork to be moved in and lowered, with the result of the article being set down on the bearing means 11, it is necessary to have a sufficient height H between the upper side 15 of the crossmember 2 and the actual bearing means, that is to say the upper side 11 of the bearing profile. The greater the height H, the less stringent are the requirements which have to be met in relation to the level of preciseness by which the fork-lift truck or the storage-and-retrieval unit has to be positioned vertically. On the other hand, it is also the case that the height H should not be too great, otherwise this results in a loss of installation space in the vertical direction in relation to the overall height of the rack.

The bearing means 11 are completely open in the forward direction, i.e. in the direction of the transverse aisle, and, in particular, do not have any stopping element or a stop there. This has the advantage that there is no need for the article to be raised in order to be removed; rather, the article can be pulled down from the bearing means 11, and thus removed from the storage location L, by a straightforward horizontal movement.

In the case of the embodiment according to FIG. 1, a rear stop 35 is present in the other direction, i.e. in the depthwise direction of the storage location L. For this purpose, the cross section of the rear crossmember 3 is L-shaped, having a horizontal limb 30 and a vertical limb 31. The upper side 36 of the horizontal limb 30 is essentially at the same height as the bearing means 11, whereas the vertical limb 31, in order to form the stop 35, projects vertically beyond the upper side 11 of the bearing profile 10. The stop 35 prevents the article from being positioned too far into the article store in the depthwise direction.

In order to fasten the rear end 13 of the bearing profile 10 on the rear crossmember 3, the horizontal limb 30 of the crossmember 3 is provided with pairs of slots 32. The two downwardly directed limbs of the bearing profile 10, configured in the form of a U-shaped profile, engage in said slots 32, and this results in the bearing profile 10 being positioned precisely on the crossmember 3 as seen in the longitudinal direction of the crossmember 3. The flat or planar crosspiece portion of the bearing profile 10, said crosspiece portion forming the bearing means 11, is supported here on the upper side 36 of the horizontal limb 30 and terminates more or less in the same horizontal plane therewith.

The front end 12 of the bearing profile 10 is not supported directly on the front crossmember 2, which also applies, in the case of the embodiment according to FIG. 2, to the rear end 13 of the bearing profile. Rather, the front end 12 or, in the case of FIG. 2, also the rear end 13 is supported vertically by an additional short support 20. The upper end of the latter is connected to the bearing profile 10. The lower end 22 of the vertical support 20 is formed for engagement in corresponding form-fit structures on the front crossmember 2.

The support 20 is arrested on the crossmember 2 by the support 20 in the first instance being fitted on the crossmember 2 and then being pivoted, in a direction of the bearing profile 10, into its definitive vertical positioning. In this positioning, the support 20 is locked or arrested by means of the form-fit structures, to be precise both in the longitudinal crossmember direction and upwards in the direction of the bearing profile 10.

The form-fit structures are formed, in part, by slots 21 in the upper side 15 of the crossmember, said slots extending in the storage and retrieval directions and thus transversally to the longitudinal crossmember direction. Two slots 21, arranged parallel to one another, are present for each vertical support 20.

The vertical supports 20 are in the form of short profiles with a U-shaped cross section and comprising two limbs 26 and a crosspiece portion 27 connecting the same. The crosspiece portion 27 is oriented outward. It terminates preferably in a single plane with the outside of the crossmember 2 or 3.

Figure 3:
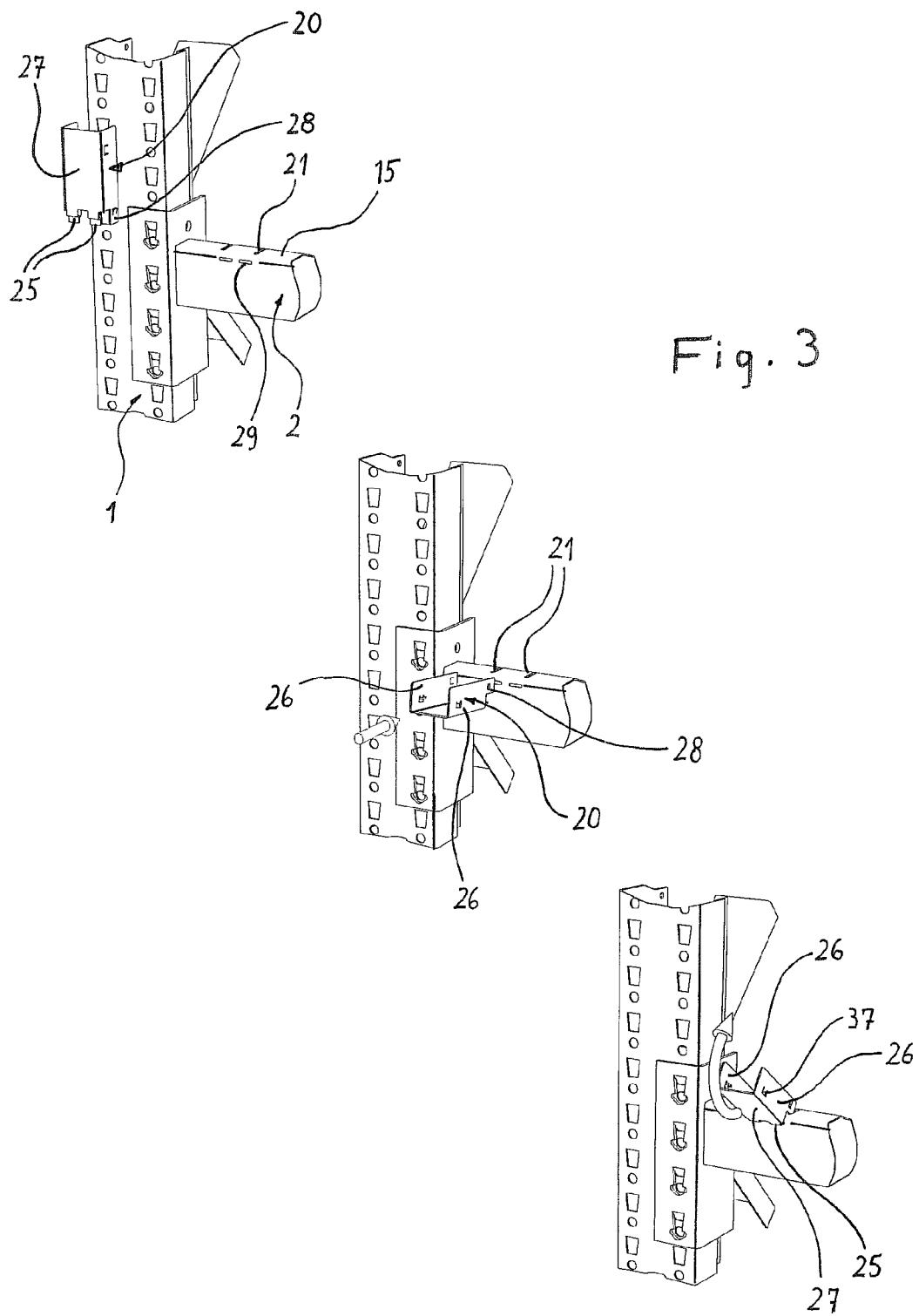
FIG. 3 shows, in successive steps, the operation of fastening a support on a crossmember of the article store.

The two limbs 26 of each support 20 are extended in the downward direction in each case to form an integral lug 28. As FIG. 3 shows in successive installation steps, with the support 20 already installed, the two lugs 28 are introduced into the two slots 21 of the front crossmember 2 or, in the case of FIG. 2, also of the rear crossmember 3. The lugs 28 and the slots 21 are arranged such that the lugs 28 can be introduced into the slots 21 by virtue of the support 20 being pivoted about a horizontal axis extending in the longitudinal direction of the crossmember.

In order to provide further form-fit structures, the outwardly oriented crosspiece portion 27 of the support 20 is also extended partially downward and, there, forms a lug or two lugs 25 provided with an angled portion (FIG. 3). Each angled lug 25 engages in a slot 29 of the crossmember. The slot 29 forms the form-fit structure of the crossmember. The slot 29 extends in the longitudinal crossmember direction and along the edge region of the crossmember, i.e. along the transition between the upper side 15 and the outside of the crossmember 2 or 3.

On account of the lugs formed on the support 20 and of the slots in the crossmember 2, the lugs 25 can be introduced into the slots only by virtue of the support 20 being pivoted, as mentioned above, about a horizontal axis extending in the longitudinal direction of the crossmember.

The measures described mean that it is not possible for the supports 20, in the installation position represented in FIGS. 1 and 2, to become detached from the crossmember 2 or 3. Rather, the action of the lugs 25 engaging in the slots 29 and of the lugs 28 engaging in the slots 21 results in the supports 20 being fixed horizontally, inter alia in the longitudinal crossmember direction. In addition, the configuration of the form-fit elements and, in particular, the S-shaped angled portion of the lugs 25 achieve locking of the support 20 in the vertical direction, that is to say upward in the direction of the bearing profile 10. There is no screw-connection or welding. It would thus also be possible for the support 20 to be released again from the crossmember.

A form-fit connection which is advantageous from the point of view of installation is present between the support 20 and the respective bearing profile 10. For this purpose, these two parts are provided with latching elements 37 which correspond to one another. Latching is achieved by the corresponding end 12, 13 of the bearing profile 10 being pushed from above into the profile cross section of the support 20 until the latching elements 37 end up latching in.

For the purpose of installing a bearing profile 10, in the first instance the short support 20 is fastened on the respective crossmember by virtue of the abovedescribed pivoting movement, in which case it assumes its vertical installation position. The angled portion on the lugs 25 prevent the support 20 from becoming detached again in the vertical direction. Then, in the case of the embodiment according to FIG. 1, the bearing profile 10, in the first instance, has its rear end 13 fastened on the slots 32 of the rear crossmember 3. In a final installation step, the front end 12 of the bearing profile 10 is lowered onto the respective support 20 until form-fitting locking and, in particular, latching take place.

Overall, therefore, the operation of installing the bearing profiles 10 takes place exclusively by virtue of form-fitting elements which are already present engaging one inside the other. There is no need for any other installation methods, such as screw-connection, riveting or welding, and this considerably reduces the amount of time required overall for installation purposes, in particular for producing extensive high-bay stores. The support 20 itself, including the lugs 28, 25, is a sheet-metal molding which can be produced inexpensively and straightforwardly.

The specification incorporates by reference the entire disclosure of German priority document 10 2013 110 361.8 having a filing date of Sep. 19, 2013.

While specific embodiments of the invention have been shown and described in detail to illustrate the inventive principles, it will be understood that the invention may be embodied otherwise without departing from such principles.

LIST OF REFERENCE CHARACTERS

1 Main support
2 Front crossmember
3 Rear crossmember
10 Bearing profile
11 Bearing means, upper side of bearing profile
12 Front end
13 Rear end
15 Upper side
20 Support
21 Slot, form-fit structure
22 Lower end of the support
25 Lug with angled portion
26 Limb
27 Crosspiece portion
28 Lug
29 Slot, form-fit structure
30 Horizontal limb
31 Vertical limb
32 Slot
35 Stop
36 Upper side
37 Latching element
A Distance
H Height
L Storage location

What is claimed is:

1. An article store comprising:
   vertical main supports (1);
   a front crossmember (2) and a rear crossmember (3), wherein the front crossmember (2) and the rear crossmember (3) each have opposed ends that are fastened to the main supports (1) and are arranged transversely to the storage and retrieval directions of the article store;
   at least one bearing profile (10) extending in the storage and retrieval directions, wherein the at least one bearing profile (10) comprises a front end arranged at the front crossmember (2) and a rear end opposite the front end and arranged at the rear crossmember (3);
   a separate vertical support (20) comprising an upper end and a lower end (22) opposite the upper end, wherein the upper end is connected to the front end of the at least one bearing profile (10) and the lower end (22) is connected to the front crossmember (2) so that the front end of the at least one bearing profile (10) is supported by the separate vertical support on the front crossmember (2) at a vertical spacing above the front crossmember (2) and an upper side (11) of the at least one bearing profile (10) is located in a plane higher than an uppermost edge of the front crossmember (2) and forms a bearing means for an article to be stored;
   wherein the front crossmember (2) comprises first form-fit structures (21, 29);
   wherein the lower end (22) of the vertical support (20) comprises second form-fit structures (25, 28) configured to engage the first form-fit structures (21, 29) of the front crossmember (2) and to fix the lower end (22) on the front crossmember (2) in a longitudinal direction of the front crossmember (2) when the lower end (22) is placed against the front crossmember (2) in an initial mounting position and the vertical support (20) is pivoted about a horizontal pivot axis, extending in the longitudinal direction of the front crossmember (2), from the initial mounting position into the vertical position of use of the vertical support (20).

2. The article store as claimed in claim 1, wherein the first and second form-fit structures are selected from slots (21, 29) and lugs (28, 25).

3. The article store as claimed in claim 2, wherein the first form-fit structures are slots (21, 29) that are formed on the crossmember (2) and the second form-fit structures are lugs (28, 25) that are formed on the lower end of the vertical support (20).

4. The article store as claimed in claim 3, wherein the lugs (28, 25) and the slots (21, 29) are arranged such that the lugs (28, 25) can be introduced into the slots (21, 29) when the lower end (22) of the vertical support (20) is placed against the front crossmember (2) in the initial mounting position.

5. The article store as claimed in claim 3, wherein at least one of the slots (29) is extending in the longitudinal direction of the front crossmember (2).

6. The article store as claimed in claim 3, wherein at least one of the slots (29) is extending in the longitudinal direction of the front crossmember (2) and wherein one of the lugs (25), engaging said at least one slot (29) is provided with an S-shaped angled portion.

7. The article store as claimed in claim 3, comprising two of said slots (21) which are arranged transversely to the front crossmember (2) and two of said lugs (28) of the lower end of the vertical support (20) engage said two slots.

8. The article store as claimed in claim 1, wherein the at least one bearing profile (10) and the vertical support (20) are connected to each other in a connecting region and are provided in the connecting region with latching elements (37) which lock in relation to one another.

9. The article store as claimed in claim 1, wherein the rear crossmember (3) is arranged at a higher level than the front crossmember (2), and wherein the rear end of the at least one bearing profile (10) is supported directly on the rear crossmember (3).

10. The article store as claimed in claim 1, wherein the rear crossmember (3) comprises a horizontal limb (30), on which the at least one bearing profile (10) is supported, and further comprises a vertical limb (31) connected to the horizontal limb so as to extend vertically beyond the upper side (11) of the at least one bearing profile (10) and to form a stop.

* * * * *